Nov. 21, 1939.   W. H. GILLE   2,180,675
FUEL COMBUSTION CONTROL SYSTEM
Filed Aug. 6, 1936   2 Sheets-Sheet 2

Inventor
Willis H. Gille
By George H Fisher
Attorney

Patented Nov. 21, 1939

2,180,675

UNITED STATES PATENT OFFICE 2,180,675

FUEL COMBUSTION CONTROL SYSTEM

Willis H. Gille, St. Paul, Minn., assignor to Minneapolis-Honeywell Regulator Company, Minneapolis, Minn., a corporation of Delaware Application August 6, 1936, Serial No. 94,502

12 Claims. (Cl. 158—28)

This invention relates to an improvement in fuel combustion systems and more particularly to means for checking the condition of the spark employed to ignite the fuel.

In a system for the combustion of fuel wherein the fuel is completely turned off at times, such as an oil burner system, it is necessary to provide some means for initially igniting the fuel. Such means commonly consists of a high tension circuit having a spark gap therein. When the spark across this gap is of the proper intensity, the fuel will be readily ignited. However, if no spark occurs, or if by reason of the electrodes being improperly spaced or for some other reason, there is not a proper spark, combustion will not take place and fuel will continue to be fed to the burner. If the ignition means should, after a brief period of such defective operation, begin to operate properly, an explosion may result due to the ignition of the accumulated fuel.

Means have been provided in the prior art for checking the condition of the spark and making the operation of the fuel feeding means dependent upon the presence of a proper spark. Such means have, however, been defective in one or more of several respects. In some cases, no provision is made for differentiating between a proper spark and one due to a partial short circuit in the spark gap. In other cases, the apparatus cannot differentiate between a spark occurring in the gap and one occurring in the leads between the high voltage secondary of the ignition transformer and the electrodes. Where spark checking means have been provided which overcame these disadvantages, they have in some cases the disadvantage of employing space discharge apparatus which is initially expensive and which must be periodically replaced. Some of these means have the further disadvantage that they are operative only when the ignition circuit is energized and some supplementary means must be employed to maintain the motor of the fuel apparatus in operation after the ignition circuit has been deenergized.

An object of the present invention is to provide a spark checking means for a fuel combustion system in which said spark checking means will be operated by the heat of the spark.

A further object of this invention is to provide a spark checking means which will initially establish the circuit of the fuel feeding motor due to the heat of a spark in the ignition circuit and which will maintain said circuit closed due to the heat of combustion of the fuel.

A further object of the present invention is to provide a new and novel switch for use in a fuel combustion control system which permits the use of a relatively small current to operate said switch, and particularly where such small current is generated in connection with the presence of a spark in the ignition circuit.

A further object of the present invention is to provide switching mechanism in which a relatively weak means is employed to bring the switch arms into contact and in which a stronger means is employed to periodically bring the switch arms into a position at which said relatively weak means can operate.

Further objects of the invention will be apparent from the accompanying specification and drawings, in which.

Figure 1:
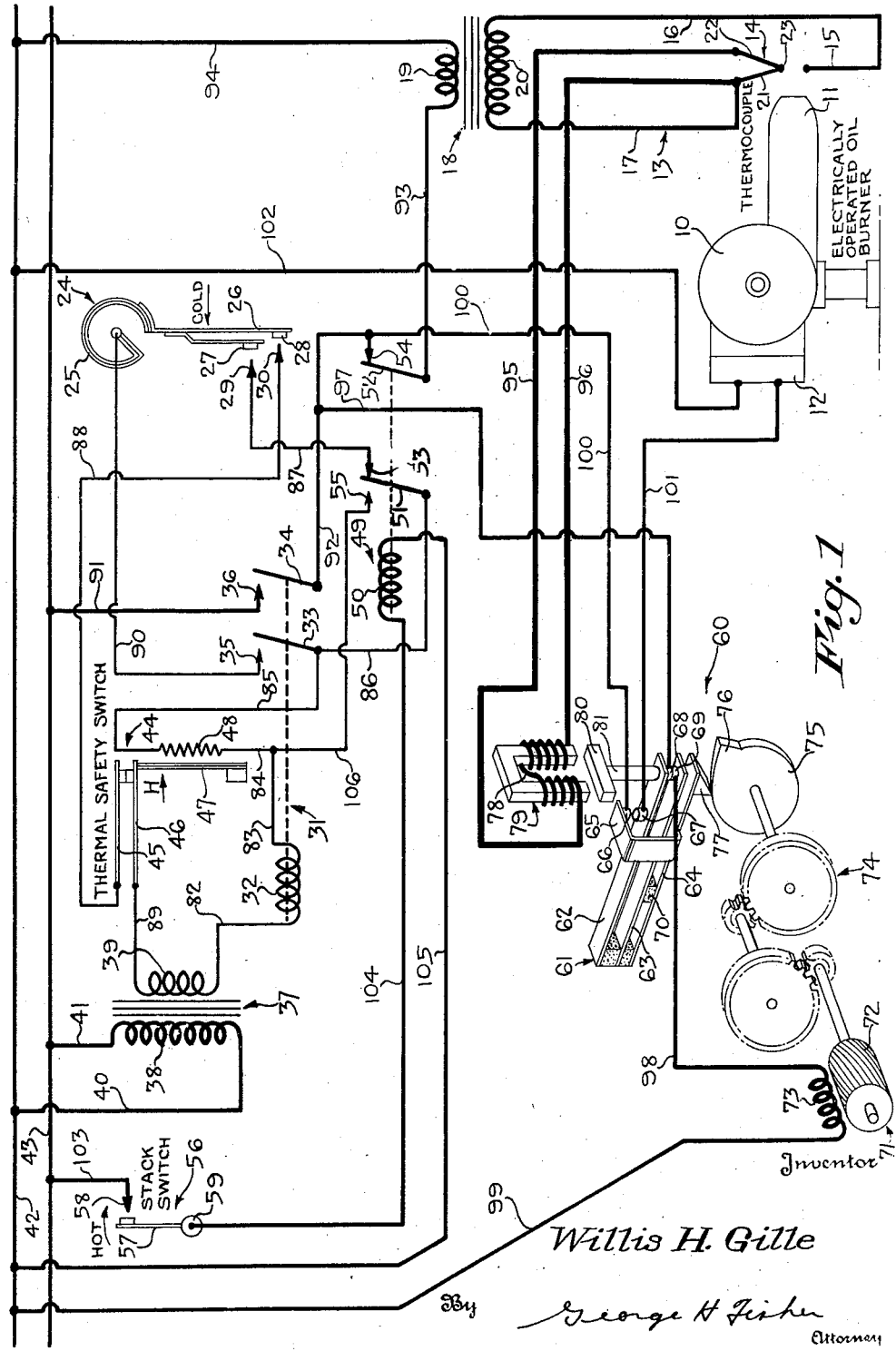
Fig. 1 is a schematic view of my fuel combustion control system.

Referring to Fig. 1 of the drawings, an electrically operated fuel feeding means is designated by the reference numeral 10. This fuel feeding means comprises a nozzle 11 through which fuel is fed, and a motor, the terminal box of which is designated by numeral 12.

The fuel issuing from nozzle 11 is ignited by means generally indicated by the reference numeral 13. Said ignition means comprises a pair of electrodes 14 and 15 connected through conductors 16 and 17 with the secondary 20 of a step-up transformer 18. This step-up transformer also includes a primary 19. Electrode 14 consists of a thermo-couple having two arms 21 and 22 of dissimilar metals. Arms 21 and 22 are joined at 23 to form the hot junction of the thermo-couple. The opposite ends of said arms are connected to means controlling the motor circuit which means will be described later.

A thermostat 24 is located in the space whose temperature is to be controlled. Said thermostat comprises a bimetallic element 25 to which is rigidly attached a contact arm 26 carrying contacts 27 and 28. Said contacts 27 and 28 are adapted to be brought into engagement with contacts 29 and 30. As indicated by a legend on the drawings, bimetallic element 25 is adapted to move contact arm 26 in the direction of contacts 29 and 30 upon a decrease in the temperature of this space. Contacts 28 and 30 are more closely spaced than contacts 27 and 29 so that upon such movement of contacts arm 26 taking place, contacts 28 and 30 will be brought into engagement before contacts 27 and 29.

Thermostat 24 controls the action of a relay

31. Said relay comprises a relay coil 32 associated with switch arms 33 and 34 which are normally biased to an open position. The relay coil is adapted to move said switch arms into contact with contacts 35 and 36, respectively, upon energization of said coil.

Low voltage power is supplied to said relay coil 32 by means of a step-down transformer 37. Said step-down transformer comprises a high voltage primary 38 and a low voltage secondary 39. Said high voltage primary is connected through conductors 40 and 41 with line wires 42 and 43 connected to a suitable source of power.

During the initial stage of operation of the system, the relay coil is controlled by a thermal safety switch 44. Said thermal safety switch is preferably of the form disclosed in the patent to Frederick S. Denison No. 1,958,081, issued May 8, 1934. This switch, as shown in the drawings, comprises two switch arms 45 and 46 held in engagement by means of a bimetallic strip 47. Associated with said bimetallic element is a heater element 48 through which current is passed during the initial stage of the operation of the system. If said flow of current continues long enough, bimetallic element 47 will be heated sufficiently that it will move to the right from under switch arm 46, allowing switch arm 46 to drop and separate from switch arm 45. After said switch has been opened, it cannot be reset automatically but must be closed manually.

A second relay 49 is provided, which relay is brought into operation after combustion takes place to move the apparatus from its starting position to the position it assumes under running conditions. Said relay comprises a relay coil 50 associated with switch arms 51 and 52. Said switch arms are normally biased to an open position so that when relay coil 50 is deenergized, said switch arms are in engagement with contacts 53 and 54, respectively. When said relay coil is energized, switch arm 51 is moved out of engagement with contact 53 and into engagement with contact 55. At the same time, switch arm 52 is moved out of engagement with contact 54.

The relay 49 is controlled by a stack switch 56. Said switch is preferably of the form disclosed in the patent to Benjamin Cyr, No. 1,768,892, issued July 1, 1930. This stack switch comprises a switch arm 57 adapted to be moved into engagement with a contact 58. Said switch arm is actuated by a bimetallic element 59 which is located in the stack and is adapted upon being heated to move switch arm 57 into engagement with contact 58.

My spark checking means is shown in the lower left-hand corner of Fig. 1 and is generally indicated by reference numeral 60. Said spark checking means comprises a switch 61. This switch 61 includes three contact carrying switch arms 62, 63 and 64. Arm 64 is provided with an integral extension 65 which extents upwardly and over switch arm 62. Said extension 65 carries a contact 66 adapted to engage with a contact 67 on arm 62. On the under surface of arm 62 is a contact 68 which is normally engaged with a contact 69 on arm 63. A spacer 70 is located between switch arms 63 and 64 so that any upward movement imparted to switch arm 64 will cause a similar movement of switch arm 63. Similarly, because of the engagement of contacts 68 and 69, any upward movement imparted to arm 63 will cause an upward movement of arm 62. A motor 71, the armature of which is indicated by numeral 72 and the field winding of which is indicated by numeral 73, is connected through suitable reduction gearing 74 with a cam 75. The toe of the cam 75 is designated by numeral 76. Cam 75 is adapted to cooperate with a cam follower 77 located on the underside of contact carrying arm 64. Upon rotation of said cam in a counter-clockwise direction, contact carrying arms 62, 63 and 64 will be periodically raised. The winding 78 of an electromagnet 79 is connected to the thermo-couple 14 and is energized by the same. The winding 78 and conductors 95 and 96 are all of relatively large wire so as to decrease the resistance and to hence increase the current flow caused by the relatively small voltage generated by the thermocouple. Associated with said electromagnet is an armature 80 connected through an extension 81 with contact carrying arm 62.

When the temperature in the space to be heated is sufficiently high, and the combustion system is not in operation, the various elements of my control system are in the position indicated in the drawings. Upon the temperature decreasing, bimetallic element 25 will move contact arm 26 in the direction of contacts 29 and 30. When such movement takes place, engagement of contacts 28 and 30 will first take place. The engagement of these contacts does not establish an energizing circuit, however. If the temperature continues to drop, contact 27 will be brought into engagement with contact 29. Upon such engagement taking place, the following energizing circuit will be established: from secondary 39, through conductor 82, relay coil 32, conductor 83, conductor 84, heater element 48, conductor 85, conductor 86, switch arm 51, contact 53, conductor 87, contacts 29 and 27, contacts 28 and 30, conductor 88, switch arms 45 and 46, and conductor 89 back to secondary 39.

The establishment of this initial energizing circuit causes relay coil 32 to be energized. The energization of this coil causes switch arm 33 to be moved into engagement with contact 35. This results in the establishment of the following holding circuit: from secondary 39, through conductor 82, relay coil 32, conductor 83, conductor 84, heating element 48, conductor 85, switch arm 33, contact 35, conductor 90, bimetallic element 25, contacts 28 and 30, conductor 88, switch arms 45 and 46, and conductor 89 back to the secondary 39. It will be noted that the holding circuit just traced does not depend upon the engagement of contacts 27 and 29. Thus, even though contact arm 26 should move slightly to the right, relay coil 32 will remain energized. Thus, vibration of the arm 26 will not result in sudden starting and stopping of the combustion apparatus.

The energization of the relay coil 32 also causes switch arm 34 to move into engagement with contact 36. This causes the following circuit to be established: from line wire 43, through conductor 91, contact 36, switch arm 34, conductor 92, contact 54, switch arm 52, conductor 93, primary 19, and conductor 94 to the other line wire 42. This causes a flow of current through the primary 19 with the resultant energization of the ignition circuit.

If the conditions in the ignition circuit are proper for the formation of a spark gap between electrodes 14 and 15, the thermo-couple 14 will become heated by reason of said spark. This will cause a current to flow between the cold terminals of arms 21 and 22. Since these arms are connected to conductors 95 and 96 in series with winding 78, this will result in the energization of the core of magnet 79. Due to the fact that the current generated by the thermo-couple is relatively small, the winding 79 will not have sufficient force to move the armature 80 into engagement therewith. Contacts 66 and 67 would, accordingly, not be brought into engagement if it were not for the following means.

The energization of relay coil 32 and resultant bringing into engagement of switch arm 34 with contact 36 establishes the following circuit through the field coil 73 of motor 71: from line wire 43, through conductor 91, contact 36, switch arm 34, conductor 92, conductor 97, contacts 68 and 69, conductor 98, winding 73, and through conductor 99 to the other line wire 42. This causes motor 71 to be put into operation causing cam 75 to rotate in a counter-clockwise direction. Upon each revolution of the cam, the engagement of the cam toe 76 with cam follower 77 causes the upward movement of switch arms 64, 63, and 62. Since these arms move simultaneously, contacts 66 and 67 remain in spaced relation. Upon each such upward movement of the switch arms, armature 80 is moved into engagement with or in close proximity to the core of magnet 79. If a proper spark is taking place in the spark gap at this time, the current flow through windings 78 will be sufficient to cause the magnet 79 to hold armature 80 in engagement therewith. As the cam now rotates and moves the cam toe 76 out of engagement with the cam follower 77, switch arms 63 and 64 will drop. Downward movement of switch arm 64 with the resultant downward movement of extension 65 causes contacts 66 to move into engagement with contact 67. At the same time, contacts 68 and 69 are separated due to the fact that arm 62 is held in a raised position while arm 63 is allowed to drop. The separation of these last named contacts opens the circuit through the field winding of the motor and stops the operation of the cam.

The engagement of contacts 66 and 67 will result in the establishment of the following motor circuit: from line wire 43 through conductor 91, contact 36, switch arm 34, conductor 92, conductor 100, contacts 66 and 67, conductor 101, through the motor, and conductor 102 to the other line wire 42. This will bring into operation the fuel feeding means and cause fuel to be fed through the nozzle 11.

If it should happen that the electrodes are in engagement or are so nearly so as to be substantially short-circuited, the heat generated in the spark gap will not be sufficient to produce current flow through the winding 78 sufficient to enable the magnet 79 to retain armature 80 in engagement therewith. Under these conditions, contacts 66 and 67 will remain separated and the fuel feeding means will not be brought into operation.

If it should happen a short circuit occurs between conductors 16 and 17, either no spark or a very feeble spark will occur in the spark gap. In this event, winding 78 will again not be sufficiently energized to result in the closing of the motor circuit. As will be obvious, if electrodes 14 and 15 are so widely separated or, if for some other reason, no current flow whatsoever takes place through the ignition circuit, the motor circuit will remain open.

Since there is an assurance that there is a proper spark before the fuel feeding means can be brought into operation, the probability is very strong that combustion will take place. If such combustion does take place, the thermo-couple 14 will now be heated by reason of said combustion and magnet 79 will thus be enabled to retain armature 80 in engagement therewith. In this manner, the motor circuit is maintained even after the ignition circuit is deenergized by means presently to be described.

The presence of combustion will cause hot gases to pass up the stack. This will result in the heating of bimetallic element 59 and result in the movement of switch arm 57 into engagement with contact 58. On such engagement taking place, the following circuit through relay coil 50 will be established: from line wire 43, through conductor 103, contact 58, switch arm 57, conductor 104, relay coil 50, and conductor 105 to the other line wire 42. This will cause energization of relay coil 50 and will result in the movement of switch arm 51 out of engagement with contact 53 and into engagement with contact 55. The moving of switch arm 51 out of engagement with contact 53 breaks the previously traced energizing circuit which is now no longer of any utility. The movement of switch arm 51 into engagement with contact 55 establishes the following new holding circuit for relay coil 32: from secondary 39, through conductor 82, relay coil 32, conductor 83, conductor 106, contact 55, switch arm 51, conductor 86, switch arm 33, contact 35, conductor 90, bimetallic element 25, contact arm 26, contacts 28 and 30, conductor 88, switch arms 45 and 46, and conductor 89 back to the secondary. It will be noted that this holding circuit does not include heater element 48 but in effect constitutes a shunt around the same. Due to the relatively high resistance of the heater element, insufficient current will flow through the same to appreciably heat the bimetallic element 47.

The energization of relay coil 50 and the resulting moving of switch arm 52 out of engagement with contact 54 breaks the circuit to the ignition transformer so that the ignition circuit is no longer energized. By the time this happens, however, combustion has taken place sufficiently long that the thermo-couple 14 is maintained heated by reason of said combustion and acts to maintain the motor circuit closed in spite of the ignition circuit being deenergized.

If, for any reason, combustion should not take place in spite of the presence of a proper spark, the stack switch 56 will not be closed and the current through relay coil 32 will continue to flow through heater element 48. After a short period of time, this will cause said heater element to heat the bimetallic member 47 sufficiently that it moves to the right out of engagement with arm 46. This allows arm 46 to drop and separate from arm 45 thus breaking the circuit through relay coil 32 and restoring the rest of the apparatus to the starting position shown in the figure. As indicated previously, however, switch 44 cannot be closed automatically and must be closed manually so that the apparatus will not again go through the starting cycle until an attendant is able to remedy the defect.

If combustion takes place but after a short period of time is interrupted for some reason or other, the system will act to automatically reestablish the ignition circuit and after a short period of time, if combustion does not take place, to place the apparatus out of operation. When said combustion ceases due to said interruption, hot gases will cease to pass up the stack with the result that stack switch 56 opens. This will result in deenergization of relay coil 50 and the resultant moving of switch arm 51 out of engagement with contact 55 and into engagement with contact 53 and the moving of switch arm 52 into engagement with contact 54. The result of the movement of switch arm 51 will be that the second mentioned holding circuit is broken and that all the current flowing through relay coil 32 will flow through the heater element 48. This will result in the thermal safety switch 44 operating unless combustion again takes place. The moving of switch arm 52 into engagement with contact 54 results in the ignition circuit again being energized. If conditions are proper for combustion, this will cause combustion to take place with a resultant reenergization of relay coil 50 and the restoration of the control apparatus to the position assumed during running condition.

Figure 2:
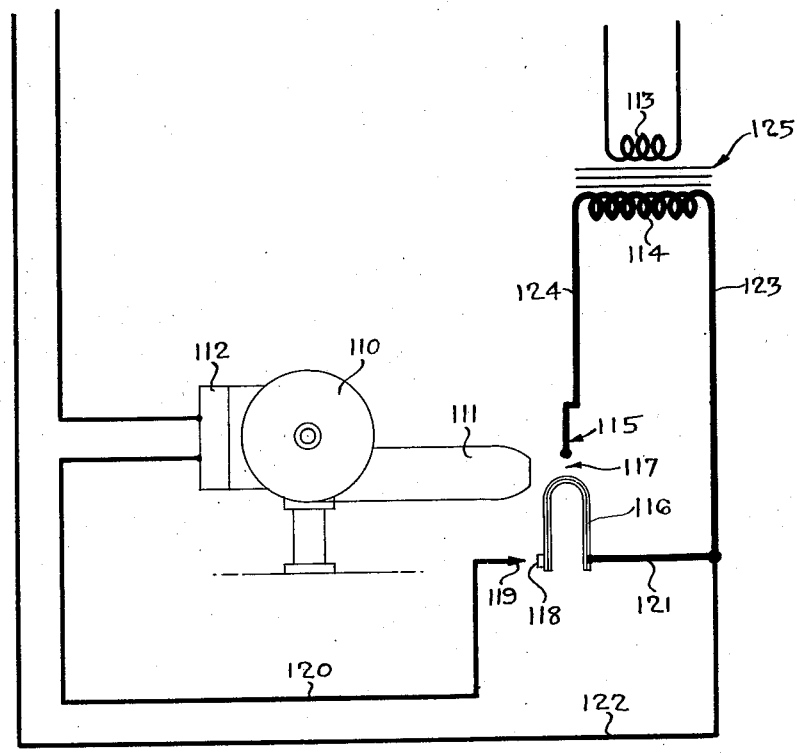
Fig. 2 is a schematic view of a modified form of the spark checking means.

In the form of my apparatus disclosed in Fig. 2, I employ a bimetallic element as one terminal of the spark gap. The heat in the spark causes this bimetallic element to close a switch in the motor circuit. Since the control apparatus, with the exception of the spark checking means, is the same as in Fig. 1, I have only shown the spark checking means and the apparatus directly associated therewith.

Referring to said figure, the electrically operated fuel feeding means is designated by the reference numeral 110. Said fuel feeding means, as in the preceding case, is provided with a nozzle 111 through which fuel is fed and a motor having a terminal box 112.

The ignition transformer is designated by the reference numeral 125 and comprises a line voltage primary 113 and a high voltage secondary 114. Said primary is connected to a suitable source of power in the same way as primary 19 of Fig. 1. The secondary 114 is connected to the terminals 115 and 116 of a spark gap 117. The terminal 116 is in the form of a bimetallic element. Said bimetallic element has at one end a contact 118 adapted to engage a contact 119, which contact is connected through a conductor 120 with the motor. The other end of said bimetallic member is connected to a conductor 121 which is connected to a conductor 122 which constitutes part of the motor circuit and corresponds to conductor 102 of Fig. 1. Conductor 121 is also connected through conductor 123 with one end of secondary 114. The other end of said secondary is connected through conductor 124 with the other terminal of the spark gap.

Upon the energization of the ignition circuit, a spark will normally occur between electrodes 115 and 116. If the terminals are correctly adjusted and there is no foreign matter present in the gap, the spark appearing across the gap will be sufficiently hot to heat bimetallic element 116 to the point where it will move contact 118 into engagement with contact 119, thus closing the motor circuit. If the terminals 115 and 116 are too close to each other or if there is some foreign matter between them resulting in the terminals being practically short-circuited, the heat generated in the spark gap will be insufficient to heat the bimetallic element sufficiently to cause it to effect engagement of contacts 118 and 119. Moreover, if a short circuit should occur between conductors 123 and 124, no spark, or a very feeble spark, will occur between electrodes 115 and 116 with the result that again bimetallic element 116 is not sufficiently heated. Of course, in the event of an open circuit condition, there will be no flow of current through the ignition circuit and under these conditions, the bimetallic element obviously will not be heated. Bimetallic element 116 is so located with respect to the flame of combustion that when combustion takes place, the element will be heated sufficiently by the combustion that it will hold contacts 118 and 119 in engagement.

It will be seen that I have provided a new and novel spark checking means which is operable by the heat of a proper spark and which is maintained in operation by the ensuing combustion. In this manner, I have eliminated the necessity of auxiliary motor circuits to be effected after the ignition circuit is deenergized. It will also be seen that my spark checking means in one of its forms involves the use of a switching mechanism wherein a relatively weak current is able to close the relatively large switch through the aid of a more powerful means which means is automatically put out of operation upon the switch being closed. It will also be seen that my spark checking means cooperates with the rest of my control system to insure a minimum of fuel being fed through the nozzle under conditions in which combustion will not take place. In this manner, I have reduced the danger of an explosion to a minimum.

While I have shown two specific embodiments of my invention, it will be understood that these are for the purpose of illustration only and that my invention is limited only by the scope of the appended claims.

I claim:

1. A switch comprising two relatively movable contact members, means for controlling the movement of said members into engagement, said means being operative only when said members are in a predetermined position relative to said means, a second means operative to periodically move said members while spaced apart from each other into said predetermined position, and means operable upon said contact members being brought into engagement to render said last named means inoperative while said contact members are in engagement.

2. A high voltage circuit having a spark gap therein, a second circuit controlled by said high voltage circuit, a switch in said second circuit comprising a pair of relatively movable contact members, means responsive to a spark in said spark gap and operative to control the movement of said members from one switch controlling position to a second switch controlling position, said means being operative only when said members are in a predetermined position relative to said means, and a second means operative to periodically move said members into said predetermined position.

3. A high voltage circuit having a spark gap therein, a second circuit controlled by conditions in said spark gap, a switch in said second circuit comprising a plurality of relatively movable contact members, electrically operated means operative to control the movement of said contact members from one circuit controlling position to a second circuit controlling position, means associated with said spark gap and generating a current upon the presence of a spark in said gap, said means being associated with said first mentioned means to operate the same, the current generated by said means being insufficient to cause said switch operating means to operate except when said contact members are in a predetermined position, and further means for periodically moving said contact members to said predetermined position.

4. In a fuel combustion system, an electrically operated fuel feeding means, a high voltage circuit including a spark gap for igniting said fuel, a switch controlling the operation of said fuel feeding means and comprising a plurality of contact members, means operative upon the presence of a spark in said gap to control the closing of said switch and bringing of said fuel feeding means into operation, said means being operative only when said contact members are in a predetermined position, and means for periodically moving said contact members into said predetermined position.

5. A system of the class described, comprising, in combination, a switch normally resting in a predetermined circuit controlling position, means to oscillate said switch back and forth without changing its circuit controlling position, an electromagnetic member and an armature member, one of said members being operated by said means to periodically bring the same adjacent the other of said members, means operative to energize said electromagnet sufficiently to maintain said members adjacent each other when so moved by said means but incapable of causing movement of said members adjacent to one another when they are spaced from each other, and means to move said switch to another circuit controlling position when said members are held adjacent each other by the action of said energizing means upon operation of said oscillating means to the position in which said members would otherwise be moved apart.

6. A system of the class described, comprising, in combination, a spark gap, means producing a spark in said gap, a circuit to be controlled by the condition of the spark gap, a switch in said circuit normally resting in a predetermined circuit controlling position, means to oscillate said switch back and forth without changing its circuit controlling position, an electromagnetic member and an armature member, one of said members being operated by said means to periodically bring the same adjacent the other of said members, a thermo-couple operative upon the presence of a spark in said spark gap to energize said electromagnet sufficiently to maintain said members adjacent each other when so moved by said means but incapable of causing movement of said members adjacent to one another when they are spaced from each other, and means to move said switch to another circuit controlling position when said members are held adjacent each other by the action of said thermocouple upon operation of said oscillating means to the position in which said members would otherwise be moved apart.

7. In a system of the class described, a switch comprising a pair of contact members normally out of engagement and biased towards one position, holding means comprising an electromagnet and a thermocouple directly energizing the same, and means for periodically and simultaneously moving said switch arms from said one position into such a position that one of said arms is brought into operative relation with said holding means, said contact arms being so related that upon said holding means acting to hold said one arm, said other arm will be brought into circuit making engagement therewith upon returning towards its original position.

8. In a fuel burner control system, a burner, means for controlling the flow of fuel to said burner, means for igniting the fuel, said igniting means comprising a high voltage source of power and a pair of spaced terminals each connected to said source of power, one of said terminals including a temperature responsive element, and means controlled by said temperature responsive element operable to cause said fuel flow controlling means to cause a flow of fuel to said burner when said temperature responsive element is subjected to the heat of a normal spark.

9. In a fuel burner control system, a burner, electrically operated means for controlling the flow of fuel to said burner and operable upon energization thereof to admit fuel to the burner, means for igniting the fuel, said igniting means comprising a high voltage source of power and a pair of spaced terminals each connected to said source of power, one of said terminals including a temperature responsive element, and a switch in the circuit of said flow controlling means and movable to closed position when said temperature responsive element is subjected to the heat of a normal spark.

10. In a fuel burner control system, a burner, electrically operated means for controlling the flow of fuel to said burner and operable upon energization thereof to admit fuel to the burner, means for igniting the fuel, said igniting means comprising a high voltage source of power and a pair of spaced terminals each connected to said source of power, one of said terminals including means for generating an electrical current upon being subjected to heat, a switch in the circuit of said fuel flow controlling means, and means operated by the curent generated by said generating means for controlling the position of said switch.

11. In a fuel burner control system, a burner, electrically operated means for controlling the flow of fuel to said burner and operable upon energization thereof to admit fuel to the burner, means for igniting the fuel, said igniting means comprising a high voltage source of power and a pair of spaced terminals each connected to said source of power, one of said terminals including a thermocouple having its hot junction located adjacent to the gap between said terminals, a switch in the circuit of said fuel flow controlling means, and electromagnetic means conneced to said thermo-couple and controlling the position of said switch.

12. In a fuel burner control system, a burner, electrically operated means for controlling the flow of fuel to said burner and operable upon energization thereof to admit fuel to the burner, means for igniting the fuel, said igniting means comprising a high voltage source of power and a pair of spaced terminals each connected to said source of power, one of said terminals including a thermo-couple having its hot junction located adjacent to the gap between said terminals, a switch in the circuit of said feul flow controlling means, electromagnetic means connected to said thermo-couple, said electromagnetic means comprising a relatively movable electromagnet and armature associated with said switch and operable when said electromagnet and armature are moved together to retain them together and to hold said switch in closed position, and means automatically operable to move said electromagnet and armature together.

WILLIS H. GILLE.